United States Patent
Schmidtler et al.

(10) Patent No.: US 10,972,482 B2
(45) Date of Patent: Apr. 6, 2021

(54) AUTOMATIC INLINE DETECTION BASED ON STATIC DATA

(71) Applicant: Webroot Inc., Broomfield, CO (US)

(72) Inventors: Mauritius Schmidtler, Escondido, CA (US); Reza M. Yoosoofmiya, San Diego, CA (US); Kristina Theroux, San Diego, CA (US)

(73) Assignee: WEBROOT INC., Broomfield, CO (US)

(*) Notice: Subject to any disclaimer, the term of this patent is extended or adjusted under 35 U.S.C. 154(b) by 143 days.

(21) Appl. No.: 15/202,247

(22) Filed: Jul. 5, 2016

(65) Prior Publication Data
US 2018/0013772 A1 Jan. 11, 2018

(51) Int. Cl.
*H04L 29/06* (2006.01)
*G06F 21/56* (2013.01)
*H04L 29/08* (2006.01)

(52) U.S. Cl.
CPC .......... *H04L 63/1416* (2013.01); *G06F 21/56* (2013.01); *G06F 21/564* (2013.01); *H04L 63/145* (2013.01); *H04L 63/1408* (2013.01); *H04L 63/1425* (2013.01); *H04L 67/06* (2013.01)

(58) Field of Classification Search
CPC . H04L 63/14; H04L 63/1408; H04L 63/1416; H04L 63/1425; H04L 63/145; H04L 67/02; H04L 67/06; G06F 21/50; G06F 21/51; G06F 21/562; G06F 21/565; G06F 21/568; G06F 21/56; G06F 21/564
See application file for complete search history.

(56) References Cited

U.S. PATENT DOCUMENTS

| 2004/0111453 A1* | 6/2004 | Harris | G06K 9/6269 |
| | | | 708/200 |
| 2009/0013405 A1* | 1/2009 | Schipka | G06F 21/562 |
| | | | 726/22 |

(Continued)

FOREIGN PATENT DOCUMENTS

EP 3016350 5/2016

OTHER PUBLICATIONS

Wei-Jen Li et al., Fileprints: Identifying File Types by n-gram Analysis, 2005, IEEE, Proceedings of the 2005 IEEE Workshop on Information Assurance, pp. 1-8 (Year: 2005).*

(Continued)

*Primary Examiner* — Robert B Leung
*Assistant Examiner* — Adrian Stoica
(74) *Attorney, Agent, or Firm* — Sprinkle IP Law Group

(57) ABSTRACT

Examples of the present disclosure describe systems and methods of automatic inline detection based on static data. In aspects, a file being received by a recipient device may be analyzed using an inline parser. The inline parser may identify sections of the file and feature vectors may be created for the identified sections. The feature vectors may be used to calculate a score corresponding to the malicious status of the file as the information is being analyzed. If a score is determined to exceed a predetermined threshold, the file download process may be terminated. In aspects, the received files, file fragments, feature vectors and/or additional data may be collected and analyzed to build a probabilistic model used to identify potentially malicious files.

20 Claims, 4 Drawing Sheets

(56) References Cited

U.S. PATENT DOCUMENTS

| | | | |
|---|---|---|---|
| 2009/0282485 A1 | 11/2009 | Bennett | |
| 2012/0227105 A1* | 9/2012 | Friedrichs | G06F 21/564 726/22 |
| 2013/0304676 A1* | 11/2013 | Gupta | G06N 5/043 706/12 |
| 2013/0347094 A1* | 12/2013 | Bettini | H04L 63/0245 726/11 |
| 2014/0181792 A1* | 6/2014 | Fanning | G06F 8/10 717/124 |
| 2015/0128263 A1 | 5/2015 | Raugas et al. | |
| 2015/0154397 A1* | 6/2015 | Bank | G06F 21/56 726/22 |
| 2015/0213365 A1* | 7/2015 | Ideses | H04L 63/14 706/12 |
| 2016/0021174 A1* | 1/2016 | De Los Santos Vilchez | H04L 43/10 709/201 |
| 2016/0072833 A1* | 3/2016 | Kim | G06F 16/334 726/23 |

OTHER PUBLICATIONS

PCT International Search Report and Written Opinion in PCT/US2017/040711, dated Oct. 16, 2017, 13 pages.

PCT International Preliminary Report on Patentability in PCT/US2017/040711, dated Jan. 8, 2019, 7 pages.

\* cited by examiner

AUTOMATIC INLINE DETECTION BASED ON STATIC DATA

BACKGROUND

Malware detection has become an integral part of cybersecurity. Often times, anti-malware scanners and similar malware detection techniques are used to detect and remove malware from malicious files. Typically, such security techniques are performed on files that have been fully downloaded and stored by a recipient device. As a result, malicious files may be mistakenly executed or transmitted by the recipient device prior to performing the security techniques. Additionally, network bandwidth, computational resources and storage space is wasted in the processing of such files.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Examples of the present disclosure describe systems and methods of automatic inline detection based on static data. In aspects, a file, such as a portable executable (PE) file, being received by a recipient device may be analyzed using an inline parser. The inline parser may identify sections of the file and feature vectors may be created for the identified sections. The feature vectors may be used to calculate a score corresponding to the malicious status of the file as the information is being analyzed. If a score is determined to exceed a predetermined threshold, the file download process may be terminated. In aspects, the received files, file fragments, feature vectors and/or additional data may be collected and analyzed to build a probabilistic model used to identify potentially malicious files.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
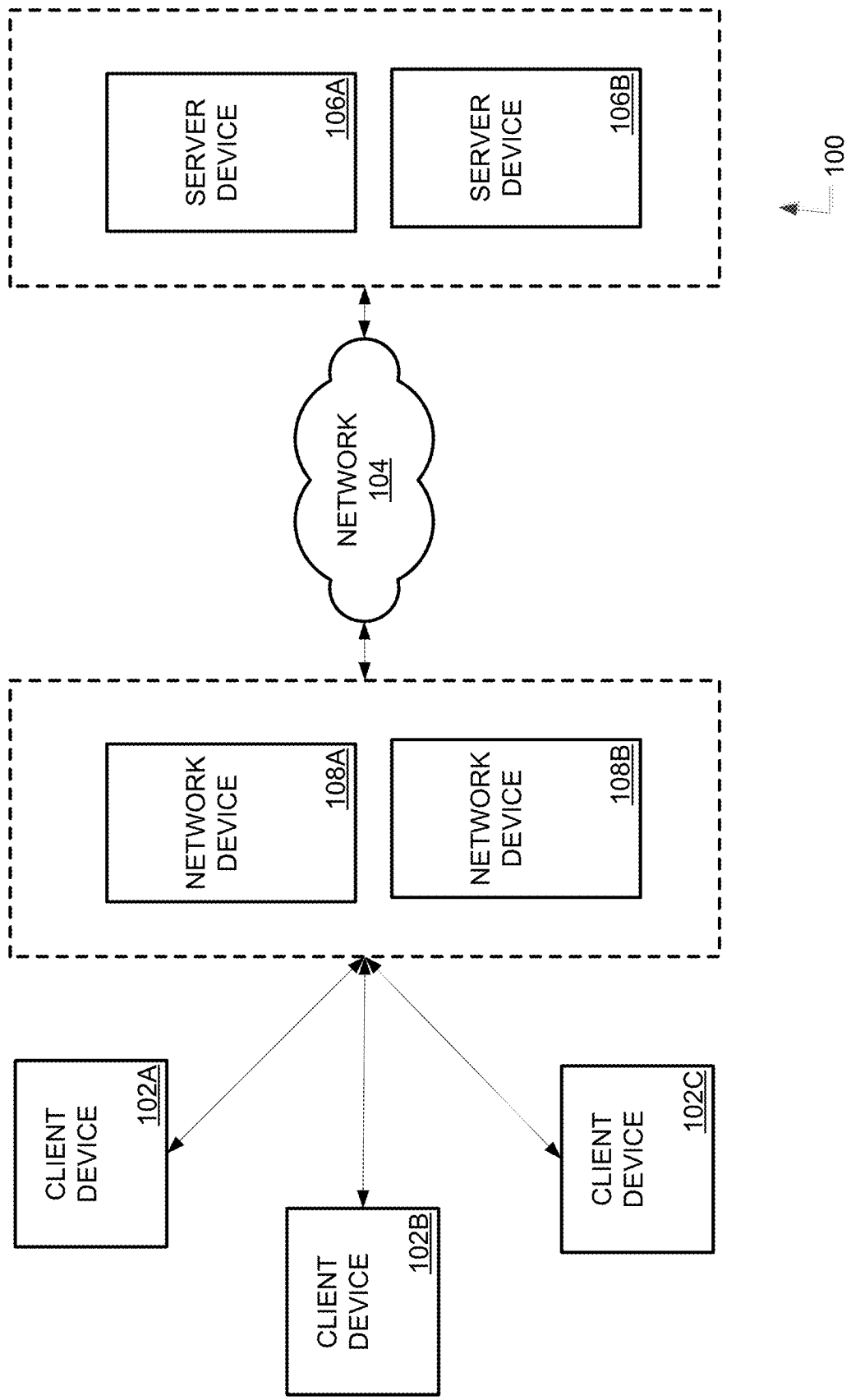
FIG. 1 illustrates an overview of an example system for automatic inline detection based on static data as described herein.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure describes systems and methods of automatic inline detection based on static data. In aspects, a file may be downloaded by a recipient device. The file may correspond to one or more data packets. In at least one aspect, the file may be a portable executable (PE) file. A PE file, as used herein, may refer to a file format for, as examples, executables, object code, and dynamic link libraries (DLLs) used in 32-bit and 64-bit versions of one or more operating systems. During the download, the data packets of the file may be analyzed using an inline parser. The inline parser may be operable to determine the format of the file. In examples, such a determination may be made by evaluating a schema, header information, one or more sections of the file, a file name, or properties of a file. The evaluation may include the use of, for example, regular expressions, comparisons with known data and/or one or more rule sets. In some aspects, based on the determined file format, the inline parser may parse the data and/or one or more sections of the file. During the parsing, the inline parser may maintain state information corresponding to the location in the file of the data currently being processed, and may identify and extract static data from the data packet currently being processed. Static data, as used herein, may refer to data points from categories such as numeric values (e.g., file size, linker version, image version, etc.), nominal values (e.g., entry point, file flags, resource encoding, etc.), string values (e.g., comments, company name, file description, etc.), Boolean values (e.g., certificate validity, export exception, count anomaly, etc.), etc. In examples, static data may be identified, analyzed and/or extracted without executing the binary file or data in which it is located. In aspects, the inline parser may be installed (or partially installed) on a sending device, an intermediate device, or a recipient device, implemented as a software development kit (SDK), and/or configured (or configurable) for a cross-platform implementation.

In aspects, the identified file sections and/or static data may be used to generate one or more feature vectors from the data. A feature vector, as used herein, may refer to an n-dimensional vector of numerical values that represent one or more features of an object. A score may be incrementally generated for one or more feature vectors and/or one or more identified file sections. The score may represent a determination of the current security status (e.g., malicious, potentially unwanted, benign, etc.) of the file. In at least one aspect, one or more threshold values may be set. The threshold values may correspond to one or more current statuses, such that exceeding a threshold causes a file (or a portion thereof) to be labeled or otherwise identified as a particular status. In some aspects, the scores may be generated using one or more machine learning techniques, such as decision tree learning, neural networks, support vector machines (SVMs), Bayesian networks, or another machine learning algorithm. In at least one aspect, the machine learning techniques may use the feature vectors as input and perform data analysis and pattern recognition on the feature vectors to generate one or more predictive models. A model, as used herein, may refer to a statistical language model that may be used to determine a probability distribution over one or more word and/or character sequences and/or to predict a response value from one or more predictors. In examples, a model may be a rule-based model, a machine-learned regressor, a machine-learned classifier, or the like. The predictive models may provide a classification score that is used to indicate the security status of the file.

Accordingly, the present disclosure provides a plurality of technical benefits including but not limited to: automatic inline detection of malicious content; static data-based content analysis; network-level security status determination; increased cybersecurity; increased accuracy of content classification models; reduced network traffic, CPU utilization and storage resources; flexible implementation options; training and using models to predict file security status; incremental content scoring; and improved efficiency and quality for applications/services utilizing examples of the present disclosure, among other examples.

FIG. 1 illustrates an overview of an example system for automatic inline detection based on static data as described herein. Exemplary system 100 presented is a combination of interdependent components that interact to form an integrated whole for automatic inline detection systems. Components of the systems may be hardware components or software implemented on and/or executed by hardware components of the systems. In examples, system 100 may include any of hardware components (e.g., used to execute/run operating system (OS)), and software components (e.g., applications, application programming interfaces (APIs), modules, virtual machines, runtime libraries, etc.) running on hardware. In one example, an exemplary system 100 may provide an environment for software components to run, obey constraints set for operating, and utilize resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic devices. As an example of a processing device operating environment, refer to the exemplary operating environments depicted in FIG. 4 In other examples, the components of systems disclosed herein may be spread across multiple devices. For instance, input may be entered on a client device and information may be processed or accessed from other devices in a network, such as one or more server devices.

As one example, the system 100 comprises client devices 102A-C, distributed network 104, a distributed server environment comprising server device 106A-B, and a network device environment comprising network devices 108A-B. One of skill in the art will appreciate that the scale of systems such as system 100 may vary and may include more or fewer components than those described in FIG. 1. In some examples, interfacing between components of the system 100 may occur remotely, for example, where components of system 100 may be spread across one or more devices of a distributed network.

In aspects, client device 102A may be configured to select and/or receive input via a user interface component or other input means. Examples of input may include voice, visual, touch and text data. The received input may be stored on the client device or in a data store accessible to the client device. Client devices 102B and 102C may be similarly configured to client device 102A, but may be a different device type from client device 102A. For example, input may be collected from client device 102A (e.g., a mobile phone), client device 102B (e.g., a tablet) and/or client device 102C (e.g., a laptop computer). Client devices 102A-C may be further configured to transmit the input to a server device, such as server devices 106A-C, via distributed network 104.

Network devices 108A-B may be configured to route and/or intercept input transmitted between client devices 102A-C and server devices 106A-B. For example, network devices 108A-B may be a firewall, a router, a proxy server, etc. and may comprise one or more components of the automatic inline detection system described herein. Network devices 108A-B may be further configured to process the intercepted input. In aspects, processing the received input may comprise analyzing a downloading file to determine a file format. Based on the file format, network devices 108A-B may parse the downloading file. During the parsing process, state information related to the current time and file section being parsed may be maintained and static data may be extracted from the file. The state information and/or the static data may be used to generate feature vectors. Network devices 108A-B may provide the feature vectors as input to a machine learning mechanism that provides security status scores for the file as output. Based on the security status scores, network devices 108A-B may terminate the file download or allow the download to complete to server devices 106A-C.

Figure 2:
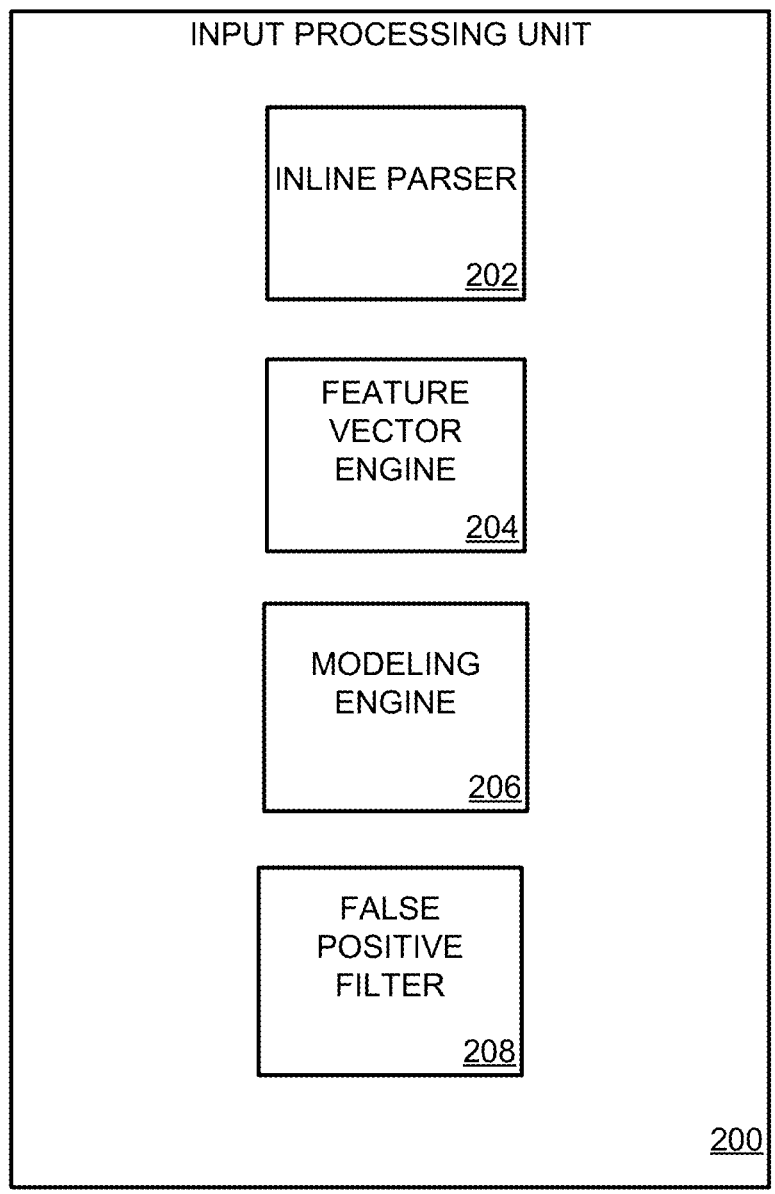
FIG. 2 illustrates an exemplary input processing unit for automatic inline detection based on static data as described herein.

FIG. 2 illustrates an overview of an exemplary input processing unit 200 for automatic inline detection based on static data, as described herein. The automatic inline detection techniques implemented by input processing unit 200 may comprise the automatic inline detection techniques and input described in FIG. 1. In alternative examples, a single system (comprising one or more components such as processor and/or memory) may perform processing described in systems 100 and 200, respectively. Further, input processing unit 200 may comprise a user interface component as described in the description of FIG. 1.

With respect to FIG. 2, input processing unit 200 may comprise inline parser 202, feature vector engine 204 and modeling engine 206. Inline parser 202 may be configured to parse input that has been downloaded or is currently being downloaded. In aspects, inline parser 202 may analyze a downloading file to determine the file format of the file. Based on the format of the file, inline parser 202 may parse the file into one or more sections and/or parse the data in the file sections. During the parsing operations, inline parser 202 may generate and/or maintain state information related to the file section, line number and/or character position currently being parsed, the current time, and/or the percentage of the file that has been analyzed. The state information may be used to determine, for example, when the file (or a section thereof) has been fully downloaded. Inline parser 202 may also identify and/or extract static data from the file. For example, during (or as a result of) the parsing operations, static data associated with a one or more files may be identified using pattern matching techniques, rule-based techniques, one or more schemas, etc. Inline parser 202 may copy the static data to a storage location (e.g., memory, a file, a data structure, a table, etc.). In an example, the static data may be loaded into a buffer of input processing unit 200 and analyzed in real-time. In at least one example, the state information and/or the static data may be stored in a data store accessible to input processing unit 200. In some aspects, inline parser 202 may be configured as an SDK such that inline parser 202 may be installed as a cross-platform implementation. In such aspects, inline parser 202 may be compiled for use with, for example, a Linux-based firewall or a Windows-based network appliance. Additionally, inline parser 202 may be operable to process multiple file downloads concurrently. For instance, input processing unit 200 may concurrently download and process several files where each file is processed on a separate thread.

Feature vector engine 204 may be configured to generate and/or score feature vectors for one or more sections of file data. In aspects, feature vector engine 204 may use extracted static data points from a file to construct one or more feature vectors. The feature vector may comprise static data from multiple categories (e.g., numerical values, nominal values, string values, Boolean values, etc.). In examples, constructing a feature vector may comprise, for example, grouping values, labeling identified anomalies in the file, converting data into hex representations, building n-grams and/or word-grams and encapsulating special characters. In at least one example, one or more feature vectors may be aggregated and stored in a data store accessible to input processing unit 200. In some aspects, the feature vector engine 204 may calculate or receive a score for one or more of the feature vectors. For example, a feature vector may be provided as input to a probabilistic model (discussed in more detail below). The probabilistic model may provide as output a score or value representing the probability that the file from which the feature vector was generated is malicious or potentially unwanted. Feature vector engine 204 may compare the score to one or more thresholds. For instance, a first threshold value differentiating benign files from potentially unwanted files and a second threshold differentiating potentially unwanted files from malicious file may be predefined. In examples, thresholds and threshold values may be generated and/or set manually or automatically using, for example, the probabilistic model. Feature vector engine 204 may assign a security status (e.g., benign, potentially unwanted, malicious, etc.) to the file based on the comparison.

In some aspects, feature vector engine 204 may be configured to terminate or alter a download based on the score and/or the determined security status of the file. For example, when a file is determined to be malicious or potentially unwanted, feature vector engine 204 may terminate the download. Alternately, upon such a determination, feature vector engine 204 may prevent the file from being transmitted to the intended recipient, and, instead, route the file to a secure environment. For instance, a determined malicious file may be routed to a sandbox environment accessible to input processing unit 200. A sandbox, as used herein, may refer to a secure computing environment for executing untested, untrusted and/or malicious code. The malicious file may then be executed and/or analyzed in the sandbox using, for example, a probabilistic model as discussed above. In another example, when a score exceeds a threshold, the feature vector engine 204 may suspend downloading the file to the intended recipient, and, instead, load the file contents into a buffer of input processing unit 200. Feature vector engine 204 may continue to process the file and update the score. When the file has been fully received by input processing unit 200, feature vector engine 204 may use the final score to determine whether to resume the download to the intended recipient. In yet another example, the determination to suspend downloading the file to the intended recipient may alternately or additionally be based on the percentage of the file analyzed thus far.

Modeling engine 206 may be configured to generate one or more probabilistic models. In aspects, modeling engine 206 may receive one or more feature vectors generated by feature vector engine 204. In some aspects, the feature vectors may represent actual user data, non-production data, unlabeled training data and/or labeled training data. Modeling engine 206 may perform data analysis and pattern recognition on the feature vectors to build and/or train one or more probabilistic models. The probabilistic models may then be used determine the security status of a downloaded or downloading file. For example, portions of a downloading file and/or one or more corresponding feature vectors may be provided directly to a probabilistic model. The probabilistic model may calculate and/or assign a score for the feature vectors based on the static data in the feature vectors. In some aspects, a score may be calculated by comparing a received feature vector to a verified data set. For example, labeled training data may be used to determine true positive and false positive thresholds for one or more static data points. A probabilistic model may compare the received feature vector to the thresholds using for example, pattern matching techniques, a rule set, fuzzy logic, machine-learned models and/or one or more weighting algorithms. Based on the comparison, modeling engine 206 may calculate a score for the feature vector representing, for example, a security determination for a file, the similarity between the feature vector and a pre-established feature vector (e.g., selected by experts or established using prior analysis), the similarity between the feature vector and a threshold, the probability that the feature vector exceeds a threshold, the percentage of the file that has downloaded and analyzed, etc. In examples, a score may be incrementally updated as a file continues to download and/or a feature vector continues to be updated.

In some aspects, the probabilistic model may be operable to determine the security status for encrypted and/or packed files without decrypting and/or unpacking the files. In such aspects, labeled, encrypted training data may be used to train the probabilistic models. In some aspects, one or more probabilistic models may be updated. For example, modeling engine 206 (or another component of input processing unit 200) may connect to a security status modeling service. The service may have more access and more recent access to downloadable files and/or feature vectors than input processing unit 200, and, therefore, may provide probabilistic models that produce more accurate results.

Figure 3:
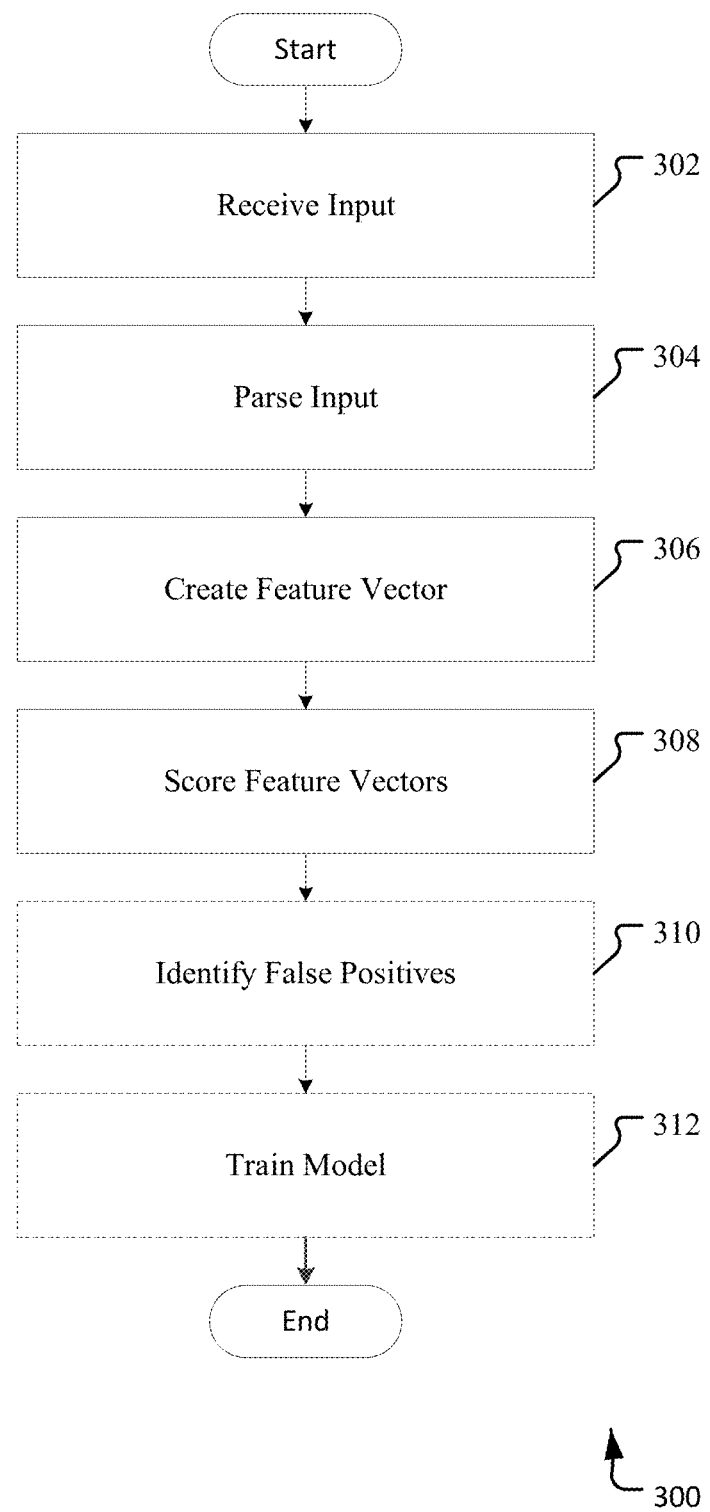
FIG. 3 illustrates an example method of automatic inline detection based on static data as described herein.

FIG. 3 illustrates an example method of automatic inline detection based on static data as described herein. In aspects, method 300 may be executed by an exemplary system such as system 100 of FIG. 1. In examples, method 300 may be executed on a device comprising at least one processor configured to store and execute operations, programs or instructions. However, method 300 is not limited to such examples. In other examples, method 300 may be performed on an application or service for providing automatic inline detection. In at least one example, method 300 may be executed (e.g., computer-implemented operations) by one or more components of a distributed network, such as a web service/distributed network service (e.g. cloud service).

Exemplary method 300 begins at operation 302 where input may be received by a computing device, such as input processing unit 200. In aspects, the computing device may receive or intercept input from a client device, such as client devices 102A-C, that is intended for a recipient device, such as server devices 106A-C. In other aspects, the computing device may receive input directly from a user via an interface. The input may represent one or more downloading executable files. The computing device may make the data stream of the executable file accessible to a parsing component, such as inline parser 202. The parsing component may analyze the file to determine the format of the file. For example, the header data of a file may be analyzed to determine the schema and/or file type of a downloading file.

At operation 304, the input may be parsed. In aspects, the input may be parsed by the parsing component based on a determined file format. For example, if the downloading file is determined to be a PE file, the parsing component may identify and parse the applicable sections (e.g., DOS headers, data directories, section tables, etc.). While the file is being parsed, state information related to the progress of the parsing component may be tracked. In at least one example, the state information may be used to efficiently resume parsing when the parsing process is suspended or terminated. In another example, the state information may be used to provide completion percentage statistics for a file. In aspects, the parsing component may extract static data from a file during the parsing process. The static data may include data such as header information, section information, import and export information, certificate information, resource information, string and flag information, legal information, comments, and program information, among other examples. In a particular example, the extracted static data may be organized into categories that identify a type of static data point. The categories may comprise, for example, numeric values, nominal values, string values and Boolean values. As an example, the static data point of an executable file may be organized as follows:

| Numeric values | Nominal values | Strings/Byte sequences | Boolean values |
|---|---|---|---|
| File size | initialize | Comments | Address Of Entry Point Anomaly |
| linker version | Un-initialize | company name | Image Base Anomaly |
| code size | entry point | file description | Section Alignment Anomaly |
| OS version | subsystem | internal name | Size Of Code Mismatch Anomaly |
| image version | file subtype | legal copyright | Low Import Count Anomaly |
| subsystem version | language | original file | Entry Point Anomaly |
| file version number | file flags masks | private build | certificate Validity |
| product version number | file flags | product name | Certificate Exception |
| size of heapr | file os | special build | Code Characteristics Anomaly |
| size of stackr | file type | product version | Code Name Anomaly |
| size of image | machine type | file version | Count Anomaly |
| PE header time | PE type | package code | Data Characteristics Anomaly |
| Section Entropy | section counts | product code | Data Name Anomaly |
| Sections count | DLL count | export DLL name | Export Exception |
| | DLL functions | assembly version | Large Number of DLLs Anomaly |
| | data directory | Certificate Issuer | flag DLL Name Anomaly |
| | export count | Certificate Subject | Number of Functions Anomaly |
| | Earliest Data Byte resources | Imports | Function Name Anomaly |
| | resources language | Exports | PE Header Anomaly |
| | resource Encoding | Section Names | High Section Count Anomaly |
| | | Non-resource section strings | PE Magic Validity |
| | resource code page | | Resource Exception |
| | resource size | | VR Code Ratio Anomaly |
| | DLL characteristics | | Import Exception |

In examples, the extracted static data may be stored by the computing device or provided as input to a feature vector creation component, such as feature vector engine 204.

At operation 306, one or more feature vectors may be created. In aspects, extracted static data may be used to generate a feature vector. Generating a feature vector may comprise, for example, grouping static data fields and/or values, labeling identified anomalies, converting data into hex representations, building n-grams and/or word-grams and encapsulating special characters. A feature vector may comprise multiple static data points from one or more categories. As an example, the following four data points may be identified in a PE file:

File size: 4982784
PEHeader Anomaly: False
Section name: .TEXT
Legal copyright: Copyright (C) Webroot Inc. 1997

Processing the identified four data points may comprise aggregating the file sizes of each data packet in the file, labeling the PE Header Anomaly, building n-grams for the section name and building word-gram for legal copyright. In at least one example, one or more of the four data points may be converted to hex code representations, which may then be used to build n-gram and/or word-grams. In aspects, analyzing a greater number of static data points may result in a more accurate classification of an executable file.

At operation 308, feature vectors may be scored. In aspects, scores or other values may be determined and assigned to a feature vector or one or more data points in a feature vector. The scores or values may represent, for example, the security status of a file, the similarity between the feature vector and a predefined feature vector, whether the feature vector exceeds a threshold, the degree of similarity between the feature vector and known malicious content, the probability that the feature vector includes potentially unwanted content, an identified threat as a percentage of the analyzed file, unexpected content, etc. In some aspects, scores may be generated (and updated) by providing feature vectors to one or more machine learning mechanisms, such as a support vector machine (SVM), a restricted Boltzmann machine or a decision tree. The machine learning mechanisms may use the feature vectors to build and/or train one or more predictive models. The predictive models may generate scores using, for example, pattern matching techniques, a rule set, fuzzy logic, machine-learned models and/or one or more weighting algorithms. For example, an SVM may perform data analysis and pattern recognition on received feature vectors to generate one or more predictive models. In another example, two or more linear SVM classifiers may be used to perform data analysis and pattern recognition on received feature vectors. The two or more linear SVM classifiers may be combined into a final classifier using, for example, ensemble methods. An ensemble method, as used herein, may refer to a learning algorithm or technique that constructs a set of classifiers and classifies new data points by taking a weighted vote of their predictions. In such an example, the evaluated static data points may be subdivided into a set of families (e.g., sections, certificate, header data, bytes sequences, etc.). A linear SVM may be trained for each family. The resulting classification scores generated by each linear SVM may then be combined into a final classification score using, for example, a decision tree. In a particular example, the decision tree may be trained using two-class logistic gradient boosting. A boosted decision tree, as used herein, may refer to an ensemble learning method in which the second tree corrects for the errors of the first tree, the third tree corrects for the errors of the first and second trees, and so forth. Predictions are based on the entire ensemble of trees. In yet another example, a classification may be subdivided into a three-class classification problem defined by malicious files, potentially unwanted files/applications and benign files. The resulting three class problem may be solved using multi-class classification (e.g., Directed Acyclic Graph SVM, a decision tree based on three-class logistic gradient boosting, etc.).

In some aspects, a feature vector (or a feature thereof) may be weighted based on category or a particular data point being evaluated. For example, a predictive model may determine that legal information (e.g., "legal copyright") provides a more accurate indication that a file may be malicious than section names. Such a determination may include an analysis that the data field "Legal Copyright" typically contains meaningful words in benign files, and is typically left empty or is filled with random characters in malicious files. Based on this determination, the legal information section (and associated data) may be assigned a higher score (e.g., +0.25) or a heavier weight (e.g., *1.25) that the section names. For instance, a predictive model may determine that the data fields "Legal Copyright" and "Section Name" are expected fields for a particular file type. Accordingly, the predictive model may assign a score of 0.1 to each of these fields if there is content in the respective field. Based on the above analysis, the predictive model may also assign a 2.50 multiplier to the "Legal Copyright" data field. In aspects, the combined information and scored for each feature may be used to accurately determine the security classification (e.g., malicious, potentially unwanted, benign, etc.) of a file. As an example, the resulting feature vector for the four data points associated with the above PE file is shown below:

Feature: Feature score
secname__002e00740065:0.204124145232
secname__0065:0.0944911182523
secname__0074006500780074:0.353553390593
secname__006500780074:0.408248290464
secname__00740065:0.144337567297
secname__002e007400650078:0.353553390593
secname__00650078:0.144337567297
secname__002e0074:0.144337567297
secname__002e:0.0944911182523
secname__00780074:0.433012701892
secname__0078:0.0944911182523
secname__007400650078:0.204124145232
secname__0074:0.472455591262
legalcopyright__0043006f007000790007200690067006800074:-0.4472135955
legalcopyright__002800430029:0.4472135955
legalcopyright__0043006f00720070002e:0.4472135955
legalcopyright__0031003900390035:0.4472135955
legalcopyright__004d006900063007200f0073006f00660074:0.4472135955
filesize__9965:1.0
PEHeaderAnomaly__False:1.0

In aspects, an action may be taken on the input based on the feature vector score and/or a determined security status for a file. In at least one aspect, if a feature vector score or value exceeds a predefined threshold or otherwise indicates that a file is not benign, input processing unit 200 may prevent the input from being transmitted to an intended recipient. For example, when a file is determined or suspected to be malicious or potentially unwanted, the input download to the intended recipient may be terminated. When such a determination is made, input processing unit 200 may also terminate its receipt of the input and remove the file or file fragment. Alternately, input processing unit 200 may allow the download to complete, then store and/or route the downloaded file to a secure environment. In one example, the secure environment may be a sandbox in which untested, untrusted and/or malicious code may be executed and analyzed. The sandbox may include or have access to the one or more predictive models described above. Results (e.g., security status determinations, feature vector scores, etc.) from files that are executed and analyzed in the sandbox may be compared to and/or used to train additional models.

At optional operation 310, one or more models may be trained. In aspects, scored feature vectors and/or associated security determinations may be provided to a modeling training component, such as modeling engine 206. For example, the modeling training component may access data, such as scored feature vectors for downloaded files and file fragments, labeled feature vectors from training data sets, security determinations for files analyzed in a secure environment, and security threshold values. In at least one example, the labeled feature vectors may be labeled by, for example, a subject matter expert, an application developer, a member of a crowdsourcing community, a judge, etc. In some aspects, labels for the labeled feature vectors may be determined using human judgment or by comparing a feature vector to a previously labeled feature vector. The modeling training component may use such data as input to train one or more predictive models, as described above. In some aspects, training a predictive model may include using human feedback. For example, a predictive model may generate feature vector scores and/or security determinations. The feature vector scores and/or security determinations may be accessible to a human judge or expert. The human judge or expert may evaluate the feature vector scores and/or security determinations and provide feedback to the modeling training component. In at least one example, the feedback may indicate a disagreement with the feature vector scores and/or security determinations generated by the predictive model. As a result, the modeling training component may alter the predictive model, the feature vector scores and/or the security determinations in accordance with the feedback. The resulting predictive models may be operable to detect malicious and/or potentially unwanted file content as a file is transmitted through a network. In some aspects, the predictive models may be updated by, for example, connecting to a predictive modeling service. In an example, the predictive modeling service may be in, or accessible to, system 100. The predictive modeling service may have access to a large amount of downloaded and downloading files, vector features and corresponding scores, and security status determinations.

Figure 4:
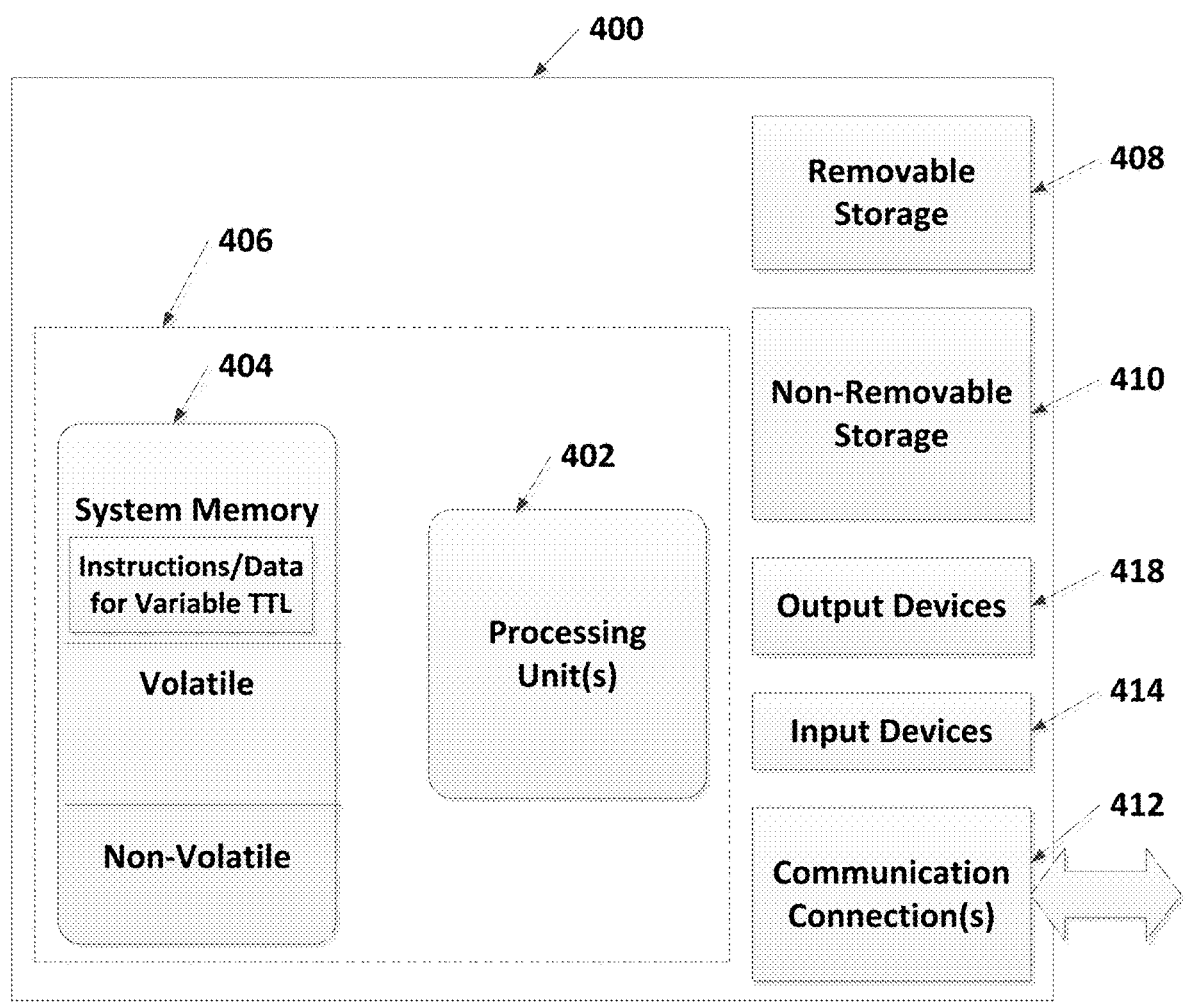
FIG. 4 illustrates one example of a suitable operating environment 400 in which one or more of the present embodiments may be implemented.

FIG. 4 illustrates one example of a suitable operating environment 400 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 400 typically includes at least one processing unit 402 and memory 404. Depending on the exact configuration and type of computing device, memory 404 (storing, among other things, reputation information, category information, cached entries, instructions to perform the methods disclosed herein, etc.) may be volatile (such as RAM), non-volatile (such as ROM, flash memory, etc.), or some combination of the two. This most basic configuration is illustrated in FIG. 4 by dashed line 406. Further, environment 400 may also include storage devices (removable, 408, and/or non-removable, 410) including, but not limited to, magnetic or optical disks or tape. Similarly, environment 400 may also have input device(s) 414 such as keyboard, mouse, pen, voice input, etc. and/or output device(s) 416 such as a display, speakers, printer, etc. Also included in the environment may be one or more communication connections, 412, such as LAN, WAN, point to point, etc.

Operating environment 400 typically includes at least some form of computer readable media. Computer readable media can be any available media that can be accessed by processing unit 402 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 400 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
    at least one processor; and
    memory coupled to the at least one processor, the memory comprising computer executable instructions that, when executed by the at least one processor, performs a method for automatic inline detection of malicious content, the method comprising:
    intercepting a first portion of an executable file that is being downloaded to a client device during the download to the client device and prior to completion of the download, the first intercepted portion comprising an incomplete portion of the executable file; and during the download of the executable file to the client device:

determining a format for the executable file using the first intercepted portion of the executable file;

based on the determined format, parsing the first intercepted portion of the executable file to identify first static data within the first intercepted portion of the executable file, wherein the parsing comprises identifying one or more data fields and corresponding data field values of the first static data using a pattern matching technique;

extracting the first static data;

creating a first set of one or more feature vectors using the extracted first static data;

generating an incremental security status score from the first set of one or more feature vectors;

intercepting a second portion of the executable file;

parsing the second intercepted portion of the executable file to identify second static data within the second intercepted portion of the executable file;

extracting the second static data;

creating a second set of one or more feature vectors using the extracted second static data;

updating the incremental security status score based on the second set of one or more feature vectors; and in response to the incremental security status score indicating that the executable file is not benign, terminating the download of the executable file to the client device prior to completion of the download.

2. The system of claim 1, wherein the executable file is a portable executable format type.

3. The system of claim 1, wherein parsing each of the first and second intercepted portions of the executable file comprises identifying state information related to the progress of the parsing operation, the state information corresponding to at least one of a position in the executable file and a time value.

4. The system of claim 1, wherein creating each of the first and second sets of one or more feature vectors comprises at least one of: grouping static data fields, labeling identified anomalies, converting data into hex representations, building n-grams and encapsulating special characters.

5. The system of claim 1, wherein the incremental security score represents at least one of: a similarity between at least one of the one or more feature vectors and a predefined feature vector, whether the incremental security score exceeds a threshold value, the degree of similarity between at least one of the one or more feature vectors and known malicious content, the probability that at least one of the one or more feature vectors includes potentially unwanted content, an identified threat as a percentage of the analyzed executable file, and unexpected content.

6. The system of claim 1, wherein at least one of the generating and updating the incremental security score comprises providing at least one of the first and second sets of the one or more feature vectors as input to a machine learning mechanism, wherein the machine learning mechanism uses the provided one or more feature vectors to train one or more predictive models.

7. The system of claim 6, wherein the machine learning mechanism is at least one of: a support vector machine (SVM), a restricted Boltzmann machine and a decision tree algorithm.

8. The system of claim 6, wherein the one or more predictive models generate the incremental security score using at least one of: a rule set, fuzzy logic, a machine-learned model and a weighting algorithm.

9. The system of claim 1, wherein terminating the download comprises:

comparing the incremental security score to a threshold value; and when the incremental security score exceeds the threshold value, providing an instruction to terminate the download.

10. The system of claim 9, wherein terminating the download comprises:

preventing a portion of the executable file from being transmitted to an intended recipient;

downloading a remainder of the executable file to the computing device; and transmitting the downloaded executable file from the computing device to a secure environment.

11. The system of claim 10, wherein comparing the incremental security score to a threshold value comprises determining whether the executable file is at least one of: malicious, potentially unwanted and benign.

12. A method for automatic inline detection of malicious content, the method comprising:

receiving, by a computing device, a set of labeled data, wherein the set of labeled data is associated with one or more executable files comprising one or more security determinations;

training one or more predictive models to determine the one or more security determinations using at least a portion of the set of labeled data;

intercepting, by the computing device, a first portion of an executable file during a download of the executable file to a client device and prior to completion of the download, the first intercepted portion comprising an incomplete portion of the executable file;

during the download of the executable file to the client device:

determining a format for the executable file using the first intercepted portion of the executable file;

based on the determined format, identifying, within the first intercepted portion of the executable file, one or more data fields and corresponding data field values of first static data using a pattern matching technique;

extracting the first static data;

creating a first set of one or more feature vectors using the extracted first static data;

using the one or more trained predictive models to generating an incremental security status score from the first set of one or more feature vectors;

intercepting a second portion of the executable file;

parsing the second intercepted portion of the executable file to identify second static data within the second intercepted portion of the executable file;

extracting the second static data;

creating a second set of one or more feature vectors using the extracted second static data;

updating the incremental security status score based on the second set of one or more feature vectors;

based on the incremental security status score, generating a security determination for the downloading executable file; and in response to the security determination indicating that the executable file is not benign, terminating the download of the executable file to the client device prior to completion of the download.

13. The method of claim 12, wherein the one or more security determinations were labeled by at least one of a subject matter expert, an application developer, a member of a crowd sourcing community, and a judge.

14. The method of claim 12, wherein training one or more predictive models comprises:
making the incremental security status score from the first and second sets of one or more feature vectors accessible to a user, receiving feedback from the user; and
using the feedback to modify at least one of the one or more predictive models and the incremental security status score.

15. The method of claim 12, wherein the extracted first and second static data are subdivided into a set of families and a predictive model is trained for each family in the set of families.

16. The method of claim 15, wherein at least two of the trained predictive models each generate a classification score, wherein the classification scores are combined into a final classification score indicating whether the executable file is malicious.

17. A computer-readable media not consisting of a propagated data signal, the computer-readable media storing computer executable instructions that when executed cause a computing system to apply a predictive model trained from a set of labeled data relating to one or more executable files to determine security determinations, to perform a method for automatic inline detection of malicious content, the method comprising:
intercepting a first portion of an executable file during a download of the executable file to a client device and prior to completion of the download, the intercepted first portion comprising an incomplete portion of the executable file;
during the download of the executable file to the client device:
determining a format for the executable file using the intercepted first portion of the executable file;
based on the determined format, identifying, within the intercepted first portion of the executable file, one or more data fields and corresponding data field values of first static data using a pattern matching technique;
extracting the first static data;
creating a first set of one or more feature vectors using the extracted first static data;
using the trained predictive model to generate an incremental security status score from the first set of one or more feature vectors;
intercepting a second portion of the executable file;
parsing the intercepted second portion of the executable file to identify second static data within the intercepted second portion of the executable file;
extracting the second static data;
creating a second set of one or more feature vectors using the extracted second static data;
updating the incremental security status score based on the second set of one or more feature vectors;
based on the incremental security status score, generating a security determination of the downloading executable file; and
in response to the security determination indicating that the executable file is not benign, terminating the download of the executable file to the client device prior to completion of the download.

18. The computer-readable media of claim 17, wherein the executable file is a portable executable format type, and wherein parsing the intercepted first portion of the executable file comprises analyzing a data stream of the executable file.

19. The computer-readable media of claim 17, wherein training one or more predictive models comprises:
making the security status score from the first and second sets of one or more feature vectors accessible to a user, receiving, from the user, feedback related to the security status score; and using the feedback to modify at least one of the one or more predictive models and the security status score.

20. The computer-readable media of claim 17, wherein determining the security determination comprises comparing the security status score to one or more threshold values, the one or more threshold values corresponding to at least one security status in the group consisting of: malicious, potentially unwanted and benign.

* * * * *